(12) United States Patent
Ring

(10) Patent No.: US 7,014,275 B2
(45) Date of Patent: Mar. 21, 2006

(54) AUTOMATIC APPLICATION HAND BRAKE APPLIED SENSOR

(75) Inventor: Michael E. Ring, Crown Point, IN (US)

(73) Assignee: Westinghouse Air Brake Technologies Corporation, Wilmerding, PA (US)

(*) Notice: Subject to any disclaimer, the term of this patent is extended or adjusted under 35 U.S.C. 154(b) by 0 days.

(21) Appl. No.: 10/741,064

(22) Filed: Dec. 18, 2003

(65) Prior Publication Data
US 2005/0134113 A1 Jun. 23, 2005

(51) Int. Cl.
B60T 17/02 (2006.01)

(52) U.S. Cl. .................................. 303/13; 303/8

(58) Field of Classification Search .................. 303/68, 303/69, 81, 82, 89, 7; 188/3 H, 3 R, 112 R, 188/153 R
See application file for complete search history.

(56) References Cited

U.S. PATENT DOCUMENTS

| | | | | |
|---|---|---|---|---|
| 3,633,614 A | * | 1/1972 | Rhodes | 137/554 |
| 3,773,366 A | * | 11/1973 | Reinecke et al. | 303/118.1 |
| 3,951,468 A | * | 4/1976 | Kolbeck et al. | 303/81 |
| 3,957,314 A | * | 5/1976 | Falke | 303/3 |
| 4,175,793 A | * | 11/1979 | Clemmons | 303/89 |
| 4,287,432 A | * | 9/1981 | Sensibar | 307/116 |
| 5,144,977 A | * | 9/1992 | Eggerton et al. | 137/554 |
| 5,558,409 A | * | 9/1996 | Walenty et al. | 303/10 |
| 5,794,739 A | * | 8/1998 | Ring et al. | 188/153 R |
| 6,394,559 B1 | * | 5/2002 | Ring et al. | 303/13 |
| 6,474,748 B1 | * | 11/2002 | Cunkelman | 303/81 |
| 6,491,352 B1 | * | 12/2002 | Engle | 303/8 |
| 2002/0180264 A1 | * | 12/2002 | Moffitt | 303/128 |
| 2003/0111902 A1 | * | 6/2003 | Thiede et al. | 303/193 |

* cited by examiner

Primary Examiner—Christopher P. Schwartz
(74) Attorney, Agent, or Firm—James Ray & Assoc.

(57) ABSTRACT

In a hand brake control system for a hand brake on a railway vehicle, a sensor detects if a spool in a fluid pressure force regulating valve of the hand brake control system is in a first position to ensure that such hand brake has been applied after an apply-hand-brake procedure has been completed.

17 Claims, 2 Drawing Sheets

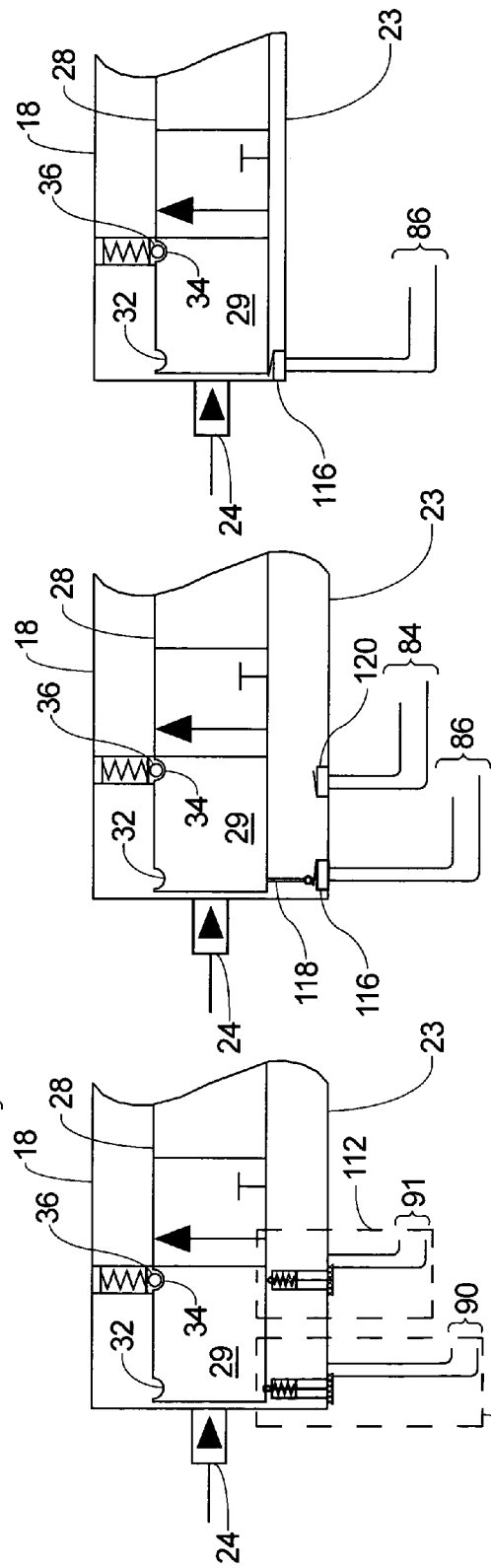

AUTOMATIC APPLICATION HAND BRAKE APPLIED SENSOR

FIELD OF THE INVENTION

The present invention relates, in general, to hand brake assemblies for use on railway type vehicles and, more particularly, this invention relates to a pneumatically activated control apparatus for activating a hand brake assembly on a railway vehicle and, even more particularly, to an automatic application hand brake applied sensor.

BACKGROUND OF THE INVENTION

The present invention is an improvement of a control apparatus for the application and release of a hand brake as described in U.S. Pat. No. 6,394,559 to Ring et al. This patent is incorporated in this application by reference thereto.

In prior art hand brake control systems the setting of the hand brake was not directly sensed, but rather a sequence of valve closings and openings was performed. While this is satisfactory for virtually all operations, the failure of, for example, certain hydraulic lines and connections would go undetected, and the hand brake would not be applied although it would be assumed to have been applied.

Therefore, it can be appreciated that a direct sensing of the position of a movable element in a regulating valve of the control system is desirable.

SUMMARY OF THE INVENTION

According to a first aspect, the present invention provides a hand brake force regulating valve in a hand brake control system on a railway vehicle wherein the hand brake control system senses if an internal element of such force regulating valve is in a first predetermined position.

In a second aspect, the present invention provides a method of applying a hand brake on a railway vehicle. Such method comprises the steps of sensing that an internal element of a force regulating valve in a brake control system of the hand brake is in a first predetermined position after such hand brake control system receives an apply-hand-brake command. Thereafter, moving such internal element to a position remote from the first predetermined position in response to the apply-hand-brake command. Then, moving such internal element back to such first predetermined position. Sensing that the internal element is again in such first predetermined position and then sending a signal from such hand brake control system indicating that the hand brake has been applied.

OBJECTS OF THE INVENTION

It is, therefore, a primary object of the present invention to provide a hand brake control system for railway vehicles which senses whether an internal element of a force regulating valve is in a first position.

Another object of the present invention is to provide a hand brake control system for railway vehicles which senses whether an internal element of a force regulating valve is in a second position.

Yet another object of the present invention is to provide a hand brake control system for railway vehicles which senses a magnetic field emanating from an internal element of a force regulating valve to detect if the internal element is in a first position.

Still yet another object of the present invention is to provide a hand brake control system for railway vehicles which senses the position of a probe which is in contact with an internal element of a force regulating valve to detect if the internal element is in a first position.

An even further object of the present invention is to provide a hand brake control system for railway vehicles which senses a portion of the surface of an internal element of a force regulating valve to detect if the internal element is in a first position.

In addition to the various objects and advantages of the present invention which have been described above various other objects and advantages of the invention will become more readily apparent to those persons who are skilled in the relevant art from the following more detailed description of the invention, particularly, when such description is taken in conjunction with the attached drawing figures and with the appended claims.

BRIEF DESCRIPTION OF THE DRAWINGS

FIGS. 2a–2e show alternative embodiments for the automatic application hand brake applied sensor of FIG. 1.

Figure 1:
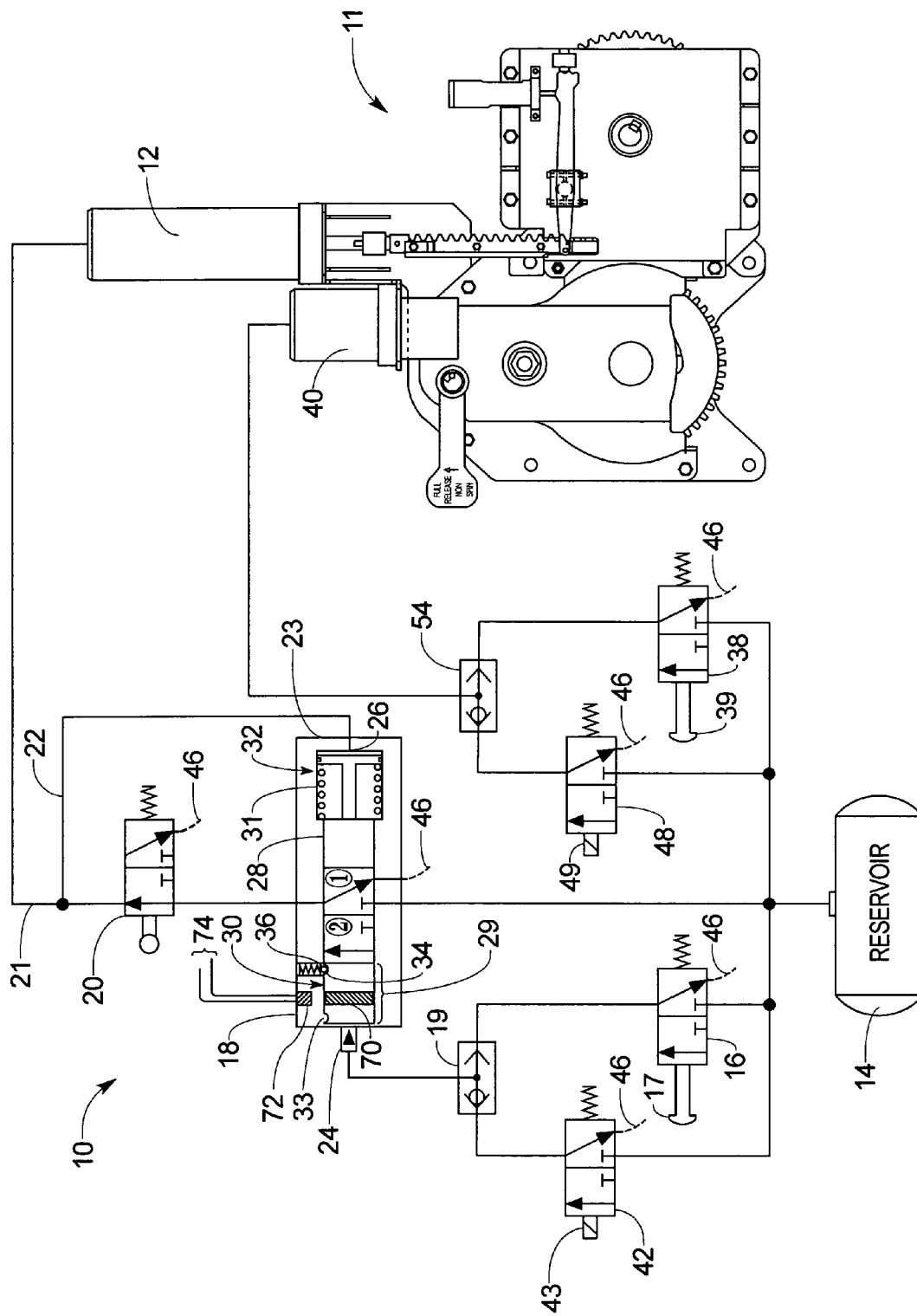
FIG. 1 is a schematic representation of an automatic application hand brake applied sensor of the present invention used in conjunction with a control apparatus for a hand brake.

It will be appreciated that for purposes of clarity and where deemed appropriate, reference numerals have been repeated in the figures to indicate corresponding features, and that the various elements in the drawings have not necessarily been drawn to scale in order to better show the features of the invention.

DETAILED DESCRIPTION OF THE INVENTION

Referring now to FIG. 1, there is shown a schematic representation of the control apparatus, generally designated as 10, that includes an automatic application hand brake applied sensor of the present invention. This control apparatus 10 is connected to a hand brake, generally designated as 11, for pneumatically controlling the application and/or release of the hand brake as discussed in detail in U.S. Pat. No. 6,394,559 to Ring et al. that is incorporated in this application by reference thereto.

The apparatus 10 of the present invention comprises a source of fluid pressure 14, such as a compressed air reservoir, engageable with the railway vehicle. A manual actuation valve 16, also referred to as a manual "push button" apply valve, is connected to the source of fluid pressure 14 for initiating communication of fluid pressure from this source. This pneumatic actuation valve 16 may be actuated by means of a push button 17. Dotted line 46 denotes a valve exhaust port to the atmosphere.

There is force regulating valve 18 connected to the pneumatic actuation valve 16, preferably, through a two way check valve 19, or apply shuttle valve, for receiving fluid pressure from the pneumatic actuation valve 16. A mechanically driven valve 20, also referred to as a reciprocator valve, is also provided in series with and connected to the force regulating valve 18 for receiving fluid pressure from the force regulating valve 18 and for communicating this fluid pressure to the application cylinder 12 to activate the hand brake 11.

The force regulating valve 18 has a housing 23 and a first fluid pressure inlet 24 and a second fluid pressure inlet 26, as well as, a piston assembly 28 which is disposed intermediate the first and second fluid pressure inlets 24 and 26, respectively. The piston assembly 28 includes a spool 29, also referred to herein as an internal element of the force regulating valve 18, at a first end 30 of the piston assembly 28. The piston assembly 28 is capable of moving within the force regulating valve 18 for opening and closing the force regulating valve 18 in response to a predetermined amount of fluid pressure supplied within either the first 24 and/or second 26 fluid pressure inlets. The force regulating valve 18 essentially regulates the amount of fluid pressure subsequently supplied to the application cylinder 12 in the manner as described below.

The first fluid inlet 24 is in fluid communication with the pneumatic actuation valve 16 through the two way check valve 19 such that upon an application of a first predetermined amount of fluid pressure through the first fluid inlet 24, the piston assembly 28 causes the force regulating valve 18 to open and communicate this first predetermined amount of fluid pressure to the mechanically driven valve 20. In other words, as a first predetermined amount of fluid pressure is fed from the pneumatic actuation means 16 into the first inlet 24, the force of this fluid pressure is sufficient to move the piston 28 in a first direction so as to open the valve and allow the fluid pressure to be fed or communicated to the mechanically driven valve 20 and subsequently to the application cylinder 12.

The second fluid inlet 26 is in fluid communication with the mechanically driven valve 20 such that upon the application of a second predetermined amount of fluid pressure through the second fluid inlet 26, the piston assembly 28 causes the force regulating valve 18 to close and terminate communication of fluid pressure to the mechanically driven valve 20 and consequently to the application cylinder 12. The mechanically driven valve 20 is in fluid communication with the second fluid inlet 26 by means of fluid line 22 which branches off from fluid pressure line 21 before the fluid pressure within this line is fed to the application valve 12.

The piston assembly 28 includes a spring member 31 at a second end 32 for biasing the piston assembly 28 in a normally closed position. The piston assembly 28 further includes a first detent 33 and second detent 34 at the first end 30. This first detent 33 and second detent 34 work in combination with a spring loaded ball 36 to hold the piston assembly 28 in either an open or closed position.

The control apparatus 10 further includes an electrically controlled actuation valve 42, also referred to as an electronic "solenoid" apply valve, that receives electrical control signals at connection 43, positioned intermediate the source of fluid pressure 14 and the two way check valve 19 that, in turn, is in fluid communication with the force regulating valve 18 to enable electrical actuation of fluid communication from the source of fluid pressure 14 to the force regulating valve 18.

Also provided in the control apparatus illustrated in FIG. 1 is a release actuation valve 38, also referred to as a manual "push button" release valve, which is connected to the source of fluid pressure 14 for initiating communication of fluid pressure from the source of fluid pressure 14 and the two way check valve or release shuttle valve 54 that, in turn, is in fluid communication with the release cylinder 40 for releasing the brakes of the hand brake assembly 11.

A push button 39 may be provided on the release pneumatic actuation valve 38 to enable manual actuation thereof. Also included in the apparatus is an electrically controlled actuation valve 48, also referred to as an electronic "solenoid" release valve, that receives electrical control signals at connection 49, and is positioned intermediate the source of fluid pressure 14 and the two way check valve 54 that, in turn, is in fluid communication with the release cylinder 40 to enable electrical actuation of fluid communication from the source of fluid pressure 14 to the release cylinder 40.

The spool 29 contains a magnet insert 70. A magnetic field sensor 72 provides an output signal on wire pair 74 of a first logic state (e.g., logic 1), indicating a closed condition, when the sensor 72 senses the magnetic field emanating from the magnet insert 70, the output signal from wire pair 74 is at a second logic state (e.g., logic 0), indicating an open state, when the sensor 72 does not sense the magnet insert 70. The magnetic sensor 72 can be a Hall effect sensor or a magnetically operated reed switch, for example.

FIG. 1 shows the system in an "at rest" state. The hand brake 11 could be applied or released. The only time of interest for the sensor 72 is during application of the hand brake 11. Assume, for example, that the hand brake 11 is in a released state (i.e., not applied). The spool 29 of the force regulating valve 18 is shown in position □ and the embedded magnet is causing a "closed" circuit condition (logic 1) on the sensor 72. Continuing with this example, the locomotive engineer is about to push a button in his cab to start the application of the hand brake 11 through an Electronically Controlled Pneumatics (ECP) brake network and through this car's Car Control Unit (CCU) or node.

Continuing the example, the locomotive engineer pushes a button to start the hand brake 11 application. The CCU on the car gets the apply-hand-brake command from the locomotive and checks the state of sensor 72 (which is closed/logic 1). The CCU then momentarily turns on the electronic solenoid apply valve 42 until the spool 29 of the force regulating valve 18 shifts to position □ and the sensor 72 reads open/logic 0. At this time the spool 29 is remote from the first position, that is, the sensor 72 does not sense that the spool 29 is in the first position. The CCU would then wait to see the sensor 72 report a closed/logic 1 which would signal the end of the application cycle and relay this information to circuitry in the locomotive which combines similar information from the other cars to display a hand-brakes-applied condition.

FIGS. 2a–2e show alternative ways of sensing whether the spool 29 is in a first position or not. FIG. 2a shows a probe 92 passing through and the housing of the force regulating valve 18 and pushed into contact with the end of the spool 29 by a spring 94.

Also shown is a grounded ring 96, outside of the housing 23, which encloses the probe 92. A second ring 98, also outside the housing 23, encloses the probe 92 but is insulated from the probe 92 and the grounded ring 96. A circular plate 100, attached to the probe 92 makes contact with ring 98 when the spool is in a first position which is the position shown in FIG. 2a. This contact will ground ring 98 which is sensed by a wire coupled to ring 98 and another wire coupled to grounded ring 96 which are brought out as wire pair 78. The wire pair 78 are isolated from each other when the spool 29 is not in the first position and shorted together when the spool 29 is in the first position.

In addition to ring 98, a second ring 102, which is also insulated from the probe 92 and the ground ring 96 together with a plate 104 attached to the end of the probe 92, can sense in the manner described above whether the spool 29 is in a second position, which is farthest away from the first position, and thereby provide an indication that the parking brake has been fully applied. This sensed condition is provided on output wire pair 80.

FIG. 2b shows a shaft 106 inserted through the spring to the bottom of the spring or top of the ball of the spring loaded ball 36 of FIG. 1. A plate 108, positioned above the shaft 106 and insulated from the housing 23 of the force regulating valve 18, will make contact with the shaft 106 when the spool 29 is not in the first position. Wire pair 82 provides an indication of whether the plate 108 is shorted to the housing of the force regulating valve 18 or not. Wire pair 82 will also indicate a short when the spool 29 is in the second position, so that during the operation of the example above, the wire pair 82 will start with an open condition when the second indent 34 is below the spring loaded ball 36, then have a momentary shorted condition when neither the first indent 32 nor the second indent 34 is below the spring loaded ball 36, then an open condition when the first indent 32 is below the spring loaded ball 36, and then another shorted condition which is followed by a steady open condition when the second indent 34 is below the spring loaded ball 36.

FIG. 2c shows an additional structure 110 of the spring, ball, shaft, insulator and plate of FIG. 2b with an output wire pair 90 placed on the bottom of the spool 29. The structure 110 operates like the spring, ball, shaft, insulator and plate of FIG. 2b, but is positioned to sense whether the spool 29 is in the first position without sensing if the spool 29 is in the second position as in the embodiment of FIG. 2b. A second structure 112, having a wire pair output 91, is like structure 110 and operates in the same manner as the corresponding structure of FIG. 2b to verify that the spool 29 moves to the second position.

A fourth alternative, FIG. 2d, shows the addition of a mechanically activated switch 116 attached to the inside of the housing 23 of the force regulating valve 18 and a mechanical member 118 attached to the spool 29 so that when the spool 29 is in the first position, the mechanically activated switch 116 will be in a first state, and will be in a second state when the spool 29 is not in the first position. A second mechanically activated switch 120 is positioned inside the housing so that when the spool 29 is in the second position the read switch 120 will be closed and will be open when the spool 29 is not in the second position.

FIG. 2e is an alternative to FIG. 2d in that the mechanical member 118 is eliminated, and the arm of the mechanically activated switch 116 makes direct contact with the end of the spool 29 when the spool 29 is in the first predetermined position.

The invention has been described in such full, clear, concise and exact terms so as to enable any person skilled in the art to which it pertains to make and use the same. It should be understood that variations, modifications, equivalents and substitutions for components of the specifically described embodiments of the invention may be made by those skilled in the art without departing from the spirit and scope of the invention as set forth in the appended claims. Persons who possess such skill will also recognize that the foregoing description is merely illustrative and not intended to limit any of the ensuing claims to any particular narrow interpretation.

I claim:

1. A railway vehicle hand brake control system, said hand brake control system comprising:
   (a) a fluid pressure force regulating valve connected for fluid pressure communication between at least a source of fluid pressure disposed on such railway vehicle and a hand brake engageable with such railway vehicle;
   (b) a movable member disposed within a housing of said fluid pressure force regulating valve and capable of moving between a predetermined plurality of positions; and
   (c) a sensing means at least one of attached to and engageable with said movable element and said housing for sensing a position of said movable member.

2. A railway vehicle hand brake control system, according to claim 1, wherein said predetermined plurality of positions is at least five positions.

3. A railway vehicle hand brake control system, according to claim 1, wherein said sensing means includes a magnetic field sensor attached to said housing and a magnet attached to said movable member such that when said movable member is moved to a first predetermined position a magnetic field of said magnet is sensed by said magnetic field sensor.

4. A railway vehicle hand brake control system, according to claim 1, wherein said sensing means includes a probe passed through said housing of said fluid pressure force regulating valve and engageable with said movable element such that movement of said movable member causes said probe to move, movement of said probe being sensed outside of said housing of said fluid pressure force regulating valve to determine if said movable member is moved to a first predetermined position.

5. A railway vehicle hand brake control system, according to claim 1, wherein said sensing means includes a mechanically activated switch mounted to said housing of said fluid pressure force regulating valve and engageable with said movable element such that said mechanically activated switch is in a first state when said movable member is in a first predetermined position and is in a second state when said movable member is in at least one other position.

6. A railway vehicle hand brake control system, according to claim 1, wherein said movable member has at least one surface irregularity formed therein, and said sensing means senses a presence of said at least one surface irregularity when said movable member is moved to a first predetermined position.

7. A railway vehicle hand brake control system, according to claim 1, wherein said sensing means includes a mechanically activated switch and senses when said mechanically activated switch is in contact with said movable member and when said mechanically activated switch is out of contact with said movable member.

8. A railway vehicle hand brake control system, according to claim 1, wherein said movable member is a spool.

9. A method of applying a hand brake on a railway vehicle comprising the steps of:
   a) sensing that an internal element of a force regulating valve in a brake control system of said hand brake is in a first predetermined position after said hand brake control system receives an apply-hand-brake command;
   b) then moving said internal element to a position remote from said first predetermined position in response to said apply-hand-brake command;
   c) then moving said internal element back to said first predetermined position;
   d) sensing that said internal element is again in said first predetermined position; and
   e) then sending a signal from said hand brake control system indicating that said hand brake has been applied.

10. The method of applying a hand brake on a railway vehicle, according to claim 9, wherein step (b) includes the step of sensing that said internal element is in a second predetermined position.

11. The method of applying a hand brake on a railway vehicle, according to claim 9, wherein step (a) includes detecting a presence of a magnetic field emanating from said internal element.

12. The method of applying a hand brake on a railway vehicle, according to claim 9, wherein step (d) includes detecting a presence of a magnetic field emanating from said internal element.

13. The method of applying a hand brake on a railway vehicle, according to claim 9, wherein step (a) includes detecting a position of a probe in contact with said internal element.

14. The method of applying a hand brake on a railway vehicle, according to claim 9, wherein step (a) includes closing a mechanical switch when said internal element moves to said first predetermined position.

15. The method of applying a hand brake on a railway vehicle, according to claim 9, wherein step (d) includes closing a mechanical switch when said internal element moves to said first predetermined position.

16. The method of applying a hand brake on a railway vehicle, according to claim 9, wherein step (a) includes detecting a surface irregularity on said internal element.

17. The method of applying a hand brake on a railway vehicle, according to claim 9, wherein step (d) includes detecting a surface irregularity on said internal element.

* * * * *